US012573548B2

(12) United States Patent
Effenberger et al.

(10) Patent No.: US 12,573,548 B2
(45) Date of Patent: Mar. 10, 2026

(54) SECONDARY COIL TOPOLOGY

(71) Applicant: Industrieanlagen-Betriebsgesellschaft mbH, Ottobrunn (DE)

(72) Inventors: Ralf Effenberger, Brietlingen (DE); Jürgen Schulte, Dersum (DE); Gerold Snieders, Papenburg (DE)

(73) Assignee: Industrieanlagen-Betriebsgesellschaft mbH, Ottobrunn (DE)

( * ) Notice: Subject to any disclaimer, the term of this patent is extended or adjusted under 35 U.S.C. 154(b) by 1102 days.

(21) Appl. No.: 17/428,101

(22) PCT Filed: Jan. 30, 2020

(86) PCT No.: PCT/EP2020/052242
§ 371 (c)(1),
(2) Date: Aug. 3, 2021

(87) PCT Pub. No.: WO2020/160989
PCT Pub. Date: Aug. 13, 2020

(65) Prior Publication Data
US 2022/0028606 A1     Jan. 27, 2022

(30) Foreign Application Priority Data

Feb. 4, 2019    (DE) ..................... 10 2019 102 654.7

(51) Int. Cl.
*H01F 21/02* (2006.01)
*B60L 53/12* (2019.01)
(Continued)

(52) U.S. Cl.
CPC .............. *H01F 38/14* (2013.01); *B60L 53/12* (2019.02); *B60L 53/39* (2019.02); *H01F 27/366* (2020.08);
(Continued)

(58) Field of Classification Search
CPC ........... H01F 38/14; B60L 53/12; H02J 50/12
(Continued)

(56) References Cited

U.S. PATENT DOCUMENTS 9,676,285 B2 *  6/2017  Niederhauser .......... B60L 53/36
2012/0025605 A1 *  2/2012  Schneider ............... H02J 50/10
307/9.1

(Continued)

FOREIGN PATENT DOCUMENTS

CN      105164771 A    12/2015
CN      109155535 A     1/2019
(Continued)

OTHER PUBLICATIONS

Translation of Office Action dated Oct. 8, 2024, for Japanese patent application No. 2021-545952, 4 pages.
(Continued)

*Primary Examiner* — Ronald Hinson
(74) *Attorney, Agent, or Firm* — Cesari and McKenna, LLP

(57) ABSTRACT

The invention relates to a coil apparatus for an inductive receiving apparatus, including a first coil with a plurality of first turns and a second coil with a plurality of second turns, wherein the first and the second coils are connected to one another in series and are wound in opposite directions relative to each other, wherein each turn includes an internally arranged conductor section and an externally arranged conductor section. With the objective of improving the interoperability of the coil apparatus, a portion of the first and second turns include respectively the internally and externally conductor section arranged such that the first and second turns respectively lie in one plane or span one plane, wherein these planes diverge with respect to one another in the direction from the first coil to the second coil or vice (Continued)

versa, depending on whether the conductor sections are in the portion of the first turns or of the second turns.

18 Claims, 3 Drawing Sheets

(51) Int. Cl.
| | |
|---|---|
| *B60L 53/39* | (2019.01) |
| *H01F 27/36* | (2006.01) |
| *H01F 27/38* | (2006.01) |
| *H01F 38/14* | (2006.01) |
| *H02J 50/12* | (2016.01) |
| *H04B 5/26* | (2024.01) |

(52) U.S. Cl.
CPC .............. *H01F 27/38* (2013.01); *H02J 50/12* (2016.02); *H04B 5/263* (2024.01)

(58) Field of Classification Search
USPC ................................................... 336/15, 221
See application file for complete search history.

(56) References Cited

U.S. PATENT DOCUMENTS

| | | | | |
|---|---|---|---|---|
| 2015/0145340 | A1* | 5/2015 | Chiyo | H02J 50/10 |
| | | | | 307/104 |
| 2015/0222129 | A1 | 8/2015 | McCauley et al. | |
| 2016/0225509 | A1* | 8/2016 | Mattsson | H10D 1/20 |
| 2016/0303981 | A1 | 10/2016 | Neumann et al. | |
| 2017/0261430 | A1 | 9/2017 | Chou | |
| 2017/0264130 | A1 | 9/2017 | Lethellier | |
| 2018/0069299 | A1* | 3/2018 | Kang | H04B 5/263 |
| 2018/0086211 | A1* | 3/2018 | Samuelsson | H01F 27/2871 |
| 2018/0205260 | A1* | 7/2018 | Maniktala | H01F 38/14 |
| 2020/0021144 | A1* | 1/2020 | Budhia | H01F 27/36 |
| 2020/0169299 | A1* | 5/2020 | Latham | H01F 19/08 |
| 2022/0123593 | A1* | 4/2022 | Nawawi | H01F 38/14 |
| 2023/0216199 | A1* | 7/2023 | Oh | H04M 1/026 |
| | | | | 343/702 |

FOREIGN PATENT DOCUMENTS

| | | |
|---|---|---|
| DE | 102015103590 A1 | 9/2016 |
| DE | 102016211198 | 12/2017 |
| DE | 102016223534 | 5/2018 |
| EP | 3385964 A1 | 10/2018 |
| EP | 3438996 A1 | 2/2019 |
| WO | WO-2016114893 | 7/2016 |
| WO | WO-2018/095846 A1 | 5/2018 |

OTHER PUBLICATIONS

English Translation of JP Office Action dated Jun. 6, 2025, JP Patent Application No. 2021-545952, 4 pages.

Canadian Office Action, Patent Application No. 3,128,935, mailed Feb. 11, 2025, 4 pages.

German Office Action from DE Patent Application No. 10 2019 102 654.7, dated Nov. 13, 2019, 9 pages.

PCT Notification of Transmittal of the International Search Report and the Written Opinion of the International Searching Authority, or the Declaration, International Searching Authority, International Application No. PCT/US2020/052242, mailed Apr. 20, 2020, 18 pages.

* cited by examiner

Sum 3.3 kg

SECONDARY COIL TOPOLOGY

The present application is a National Stage of International Application No PCT/EP2020/052242, filed Jan. 30, 2020, which application claims priority to commonly owned German Patent Application No. 102019102654.7, filed on Feb. 4, 2019, which applications are incorporated herein by reference in their entirety.

TECHNICAL FIELD

The invention relates to a coil apparatus for receiving an alternating magnetic field, in particular for an inductive charging system. The coil apparatus is also provided for a secondary device of an inductive charging system for a contact-free inductive energy transfer to transport means.

BACKGROUND

Vehicles powered by their own engine such as, for example, motor vehicles, motorbikes and locomotives are to be understood by the term "transport means" in the following. Such vehicles can be rail-bound or not rail-bound. The engine can include an internal combustion engine, an electric motor or a combination of the two, e.g. in the form of a hybrid drive.

The term "inductive charging system" is understood as a system for a contact-free energy transfer by means of alternating magnetic fields. The system includes a primary device (also called "primary system" or "primary element") as the energy source and a secondary device (also called "secondary system" or "secondary element") as an energy receiver; similar to a transformer apparatus. The primary device is designed to generate an alternating magnetic field. The secondary device is designed to receive an or the alternating magnetic field and to generate an induction current from the alternating magnetic field. The generation of the alternating magnetic field is achieved by means of an alternating current flowing through electrical conductors, in particular coils, of the primary device and the generation of the induction current is achieved by means of electrical conductors of the secondary device positioned in the magnetic field.

WO 2016114893 describes an apparatus for wirelessly transferring power and includes a first coil with a first winding path and a second coil with a second winding path. The apparatus comprises a holding device configured to hold the first coil and the second coil in a predetermined winding pattern. Each of the first and second winding paths comprises a plurality of successive winding groups. In each of the plurality of successive winding groups, at least a portion of each winding of consecutive windings is arranged on top of an immediately previous winding on the holding device for a predetermined number of windings. The disclosed coil arrangement can function either as a transmitter or as a receiver.

Essentially, two different coil topologies are used for electromagnetic induction. The first coil topology is a circular coil, i.e. a coil with at least one turn around a centre. The second coil topology is a bipolar coil (also known as a double-D coil), which comprises a first coil with one or more turns around a first centre and a second coil with one or more turns around a second centre. The first coil is electrically connected to the second coil in series and wound in the opposite direction relative to the second coil.

The prior art exhibits the drawback of only being designed for a specific magnetic field pattern in which the coil arrangement functions optimally and enables an optimal energy transfer. In technical terms, such coil arrangements have interoperability issues. This means that, for example, a vehicle with a secondary coil from one manufacturer can only be charged on a stationary apparatus with a primary coil from another manufacturer with high losses (interoperability).

For each magnetic field pattern generated, a specific secondary coil topology is thus preferable in order to achieve an optimal energy transfer from the at least one primary coil to the at least one secondary coil.

In order to improve the interoperability of secondary coils, additional receiving coils are currently being added, which are respectively more suitable for receiving a corresponding magnetic field pattern. However, such coil arrangements exhibit the drawback of being heavy and costly.

It is thus the object of the present invention to provide an improved coil apparatus for an inductive receiving system, i.e. a secondary coil with a higher interoperability, which simultaneously has a cost-effective and simple design.

SUMMARY

To this end, the present invention provides a coil apparatus according to claim 1. The latter is in particular configured in such a manner that it comprises a first coil with a first winding path A or a plurality of first turns and a second coil with a second winding path B or a plurality of second turns, wherein the first and the second coils are connected to one another in series and are configured to run in opposite directions relative to each other. This means in particular that the two winding paths are configured in such a manner that a current flowing through the two coils flows clockwise in the first winding path and counterclockwise in the second winding path or vice versa. Each winding has a conductor/conductor section arranged internally and a conductor/conductor section arranged externally, which are arranged in particular parallel to each other. The coil apparatus according to the invention is characterized in that the internally and externally arranged conductors of at least a portion of the first and second turns, respectively, are arranged in such a manner that they respectively lie in, i.e. span, a plane, wherein these planes diverge with respect to each other in the direction from the first coil to the second coil or vice versa, depending on whether the conductors/conductor sections are conductors/conductor sections of the first turns or of the second turns.

It has been found in this connection that the coil apparatus according to the invention has a higher interoperability with different magnetic field patterns, of both circular and bipolar coils. The coil apparatus is thereby more flexible in terms of its range of application and can thus be used with numerous different primary coils.

Another advantage is the improved, i.e. increased, alignment offset of the coil apparatus. This means that the coil apparatus does not have to be arranged centrally or at a specific point vis-à-vis the primary coil in order to constantly attain the best transfer efficiency. In other words, the coil apparatus exhibits a smaller decrease in transmission efficiency in comparison with the prior art when it is offset from a predetermined point in relation to the primary coil; the transfer efficiency remains almost constant. An alignment of the coil apparatus is thus easier while a constant energy transfer is more resistant to positional deviations between the secondary and primary coils.

In a preferred embodiment, the coil apparatus additionally comprises a ferrite arrangement configured in such a manner that it at least partially covers winding path sections arranged centrally in the coil apparatus, i.e. the internally arranged conductors of the first and second coils, on one side, in particular on the side of an inductive transmitter system or primary coil, and at least partially does not cover or does not at all cover the remaining winding path sections of the first and second coils on this side. The ferrite arrangement facilitates a better magnetic field guidance and thus a more effective energy transfer. This occurs in particular by at least partially covering the centrally arranged winding path sections, which is achieved by means of at least one ferrite arrangement arranged on the intermediate conductors and thus imitates a solenoid coil. Preferably, at least 50% of the winding path sections are covered, although there are also embodiments in which the centrally arranged conductors are completely covered by one or more ferrite arrangements. The ferrite arrangement can also extend up to the two opposite, externally arranged conductors of the first and second coils and thus, in particular, at least partially cover the same.

In addition, the remaining winding path sections, i.e. all conductor sections except the centrally or internally arranged conductors, can also not be covered at all by the ferrite arrangement; in particular on the side on which the internally arranged winding path sections are covered.

The ferrite arrangement also has the advantage that it acts as a holding device for the coils. The ferrite arrangement thus performs several functions such as, e.g., magnetic field guidance, especially stray field reduction, as well as the positioning and holding of the coil conductors.

In an advantageous embodiment, the first and second coils are respectively configured to be spiral-shaped, in particular on at least one plane. In the process, the diameter of the turns increases from one turn to the next in the coil in question. This has the advantage of controlling or reducing the height of the coil apparatus and in particular of making it flat. The turns here can describe a circular, square, rectangular or any other geometric shape.

In order to produce a particularly uniform design of the coil apparatus, the internally arranged conductors/conductor sections are arranged so as to be adjacent to one another and in particular at least partially parallel to one another. This design is uniform and efficient in its use of space. In addition, interoperability with, e.g., circular coils is improved.

Preferably, the distance between the directly adjacent internally arranged conductors/conductor sections of the first and second coils is greater than the distance between the directly adjacent externally arranged conductors/conductor sections of the first and second coils. This has the advantage that the characteristics of a bipolar coil do not predominate so that the coil apparatus is not only geared to this design and a corresponding magnetic field.

It has further proven advantageous when directly adjacent laterally arranged conductors of the first and second coils are arranged in pairs at least partially on top of one another. This makes it possible to reduce the width of the corresponding path sections and thus reduce the dimensions or extension of the coil apparatus in width and length. In particular, due to the ferrite arrangement according to the invention, it is advantageous to arrange or stack the conductors one on top of the other in the corresponding path sections, as the use of space in terms of the height of the coil apparatus is already set by the ferrite arrangement. It is also possible to arrange three or more conductors on top of one another, depending in particular on the height of the ferrite arrangement and the diameter of the conductor.

Preferably, the ferrite arrangement comprises two rectangular ferrite plate assemblies (or ferrite moulded parts, or ferrite devices) arranged parallel to and spaced apart from each other, wherein two supply conductors for the two coils can extend between the ferrite plate assemblies. This has the advantage of saving weight and simultaneously providing space for the supply conductors. As the two ferrite plate assemblies can be configured to be identical to one another and can be symmetrically arranged in relation to the coil apparatus, corresponding magnetic fields are not adversely affected.

It has further proven advantageous when the ferrite plate assemblies are formed from a plurality of identically shaped or configured ferrite plates and/or from moulded parts with a certain magnetic permeability. Besides known ferrite plates, it is also possible to use moulded parts. Alternatively or in addition to the ferrite plate assemblies, it is possible to use ferrite concrete as a ferrite arrangement, which, like concrete, is mixed in liquid form and can be poured into a specific shape before hardening. This concrete has a lower magnetic permeability but can be adapted to the properties of the ferrite plate assembly via corresponding geometric or structural dimensioning.

Preferably, the ferrite plate assemblies respectively comprise a recess in which the internally arranged conductors/conductor sections of the first and second coils are arranged. This has the advantage of reducing the height of the coil apparatus and decreasing required space. In a further advantageous embodiment, the ferrite arrangements extend over the externally arranged conductors/conductor sections of the first and second coils. This additional extension of the ferrite arrangements helps to stabilize the apparatus as well as to reduce stray magnetic fields, i.e. to focus the magnetic field on the coil(s).

In order to further improve the shape or progression of the magnetic field, the internally arranged conductors/conductor sections are arranged on a first plane and the externally arranged conductors/conductor sections are arranged on a second plane, the first plane being arranged parallel to and at a distance from the second plane.

The coil apparatus according to the invention can be installed in both a secondary system as well as a primary system. That is to say that the coil apparatus can act either as a receiver device, transmitter device or transmitter/receiver device (i.e. transceiver).

The figures described in the following relate to preferred embodiments of the present invention and are not intended to be limiting, but rather to provide additional explanation and clarification of the features of the illustrated coil apparatuses. It is noted that these features, individually or in combination, can be combined with the embodiments described in the foregoing. Features shown in different figures with the same reference signs can be the same.

BRIEF DESCRIPTION OF THE DRAWINGS

The figures show

DESCRIPTION

Figure 1:
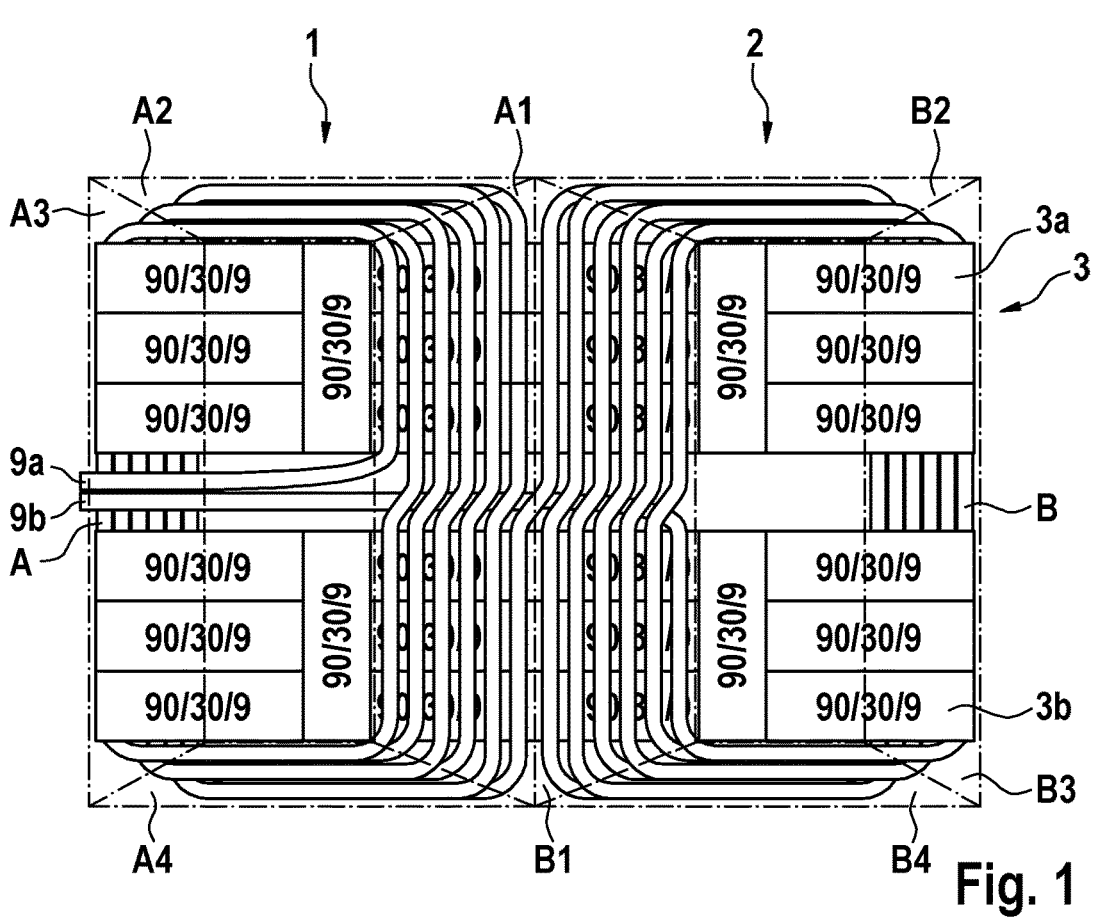
FIG. 1 a top view of a coil apparatus according to the invention according to a preferred embodiment, FIG. 2A the two identical ferrite arrangements of FIG. 1, each comprising a plurality of identically shaped and sized ferrite plates, FIG. 2B a longitudinal cross-section along a ferrite arrangement of FIG. 1, FIG. 2C a selection of three different ferrite plates, which differ in weight and thickness, FIG. 3 a longitudinal cross-section through a coil apparatus according to a further preferred embodiment, and FIG. 4 three different cross-sectional views along the width of the coil apparatus of FIG. 3.

FIG. 1 shows a top view of a coil apparatus according to a preferred embodiment according to the present invention with a first coil 1 and a second coil 2. The coils 1, 2 comprise a common electrical conductor and are thus electrically connected in series. The coils 1, 2 are spiral-shaped, arranged next to each other and can be electrically contacted or connected via the two current supply conductors or power connections 9a, 9b. Except for a few minor details, the two coils 1, 2 are arranged and shaped so as to be axially symmetrical in relation to each other. Each coil 1 and 2 comprises its own winding path A and B, respectively, which respectively forms part of the common electrical conductor and which is respectively divided into four path sections or conductor sections. The first coil 1 is divided into areas comprising a first path section A1, a second path section A2, a third path section A3 and a fourth path section A4, said path sections A1 to A4 being arranged in a sequence running counterclockwise. The second coil 2 is divided into areas consisting of a first path section B1, a second path section B2, a third path section B3 and a fourth path section B4, said path sections B1 to B4 being arranged in a sequence running clockwise. The following path sections thus lie opposite one another within a coil: path sections A2 and A4 (also designated as laterally arranged conductors/conductor sections of the first coil) and path sections A1 and A3 (also designated as internally and externally arranged conductors/conductor sections of the first coil), path sections B2 and B4 (also designated as laterally arranged conductors/conductor sections of the second coil) and path sections B1 and B3 (also designated as internally and externally arranged conductors/conductor sections of the second coil). Furthermore, the path sections A1 and B1 of the first and second coils 1, 2 are directly adjacent to each other. In the present invention, a path section defines an area of the coil in which the conductors/conductor sections arranged therein comprise specific properties with regard to their arrangement and shaping. Deviations from this definition exist at the transition boundaries between the different winding path sections at which the conductors describe a bend or curve and lead into the next winding path section.

All winding path sections A1 to A4 and B1 to B4 are characterized in that the conductors arranged therein are arranged so as to be essentially straight and parallel to one another. The winding path sections A1 and B1 exhibit an exception, as in these sections the conductors each have a kind of step or curvature in the middle. The function of the step is to start a new turn or circuit of the first or second coils, to increase the diameter of the turn towards the centre of the coil apparatus and thus to allow the straight and parallel formation of the remaining portions of the common conductor, in particular in the sections A1 and B1. The distance between two adjacent conductors in the path sections A1 and B1 is always the same and in particular greater than the distance between the conductors in the path sections A3 and B3. The properties of a bipolar coil topology are attenuated by the larger spacing of the conductors in sections A1 and B1. What is special about the sections A3 and B3 is the arrangement of the conductors: while, e.g., a conductor in the sections B1, B2 and B4 runs along the outer edge of the coil, the same conductor in the section B3 is arranged at the inner edge of the coil or at the coil opening. The reverse is true for the inner conductors in the sections B1, B2 and B4, which are arranged in the section B3 at the outer edge of the coil or coil apparatus. In the path sections A2, A4, B2 and B4, the conductors are arranged in pairs on top of each other in order to reduce the width of the coil apparatus. The coil apparatus further comprises a ferrite arrangement 3 consisting of two identically configured ferrite plate assemblies 3a and 3b. It is noted here that more than two and/or differently shaped and/or sized ferrite plate assemblies can be used in other embodiments. The ferrite plate assemblies 3a and 3b respectively extend through the two coils 1 and 2 and over the entire length of the coil apparatus, i.e. completely from the left edge of the first coil 1 to the right edge of the second coil 2. Depending on the height of the ferrite arrangement, it is of course also possible for more than two conductors to be arranged on top of one another in order to make the coil apparatus more compact. On the side of the coil apparatus, the current supply conductors 9a and 9b can be seen running between the ferrite plate assemblies 3a and 3b into the centre of the coil apparatus and finally forming coils 1 and 2 via a spiraling, i.e. a plurality of turns, counterclockwise in the one case and clockwise in the other, respectively.

Figure 2A:
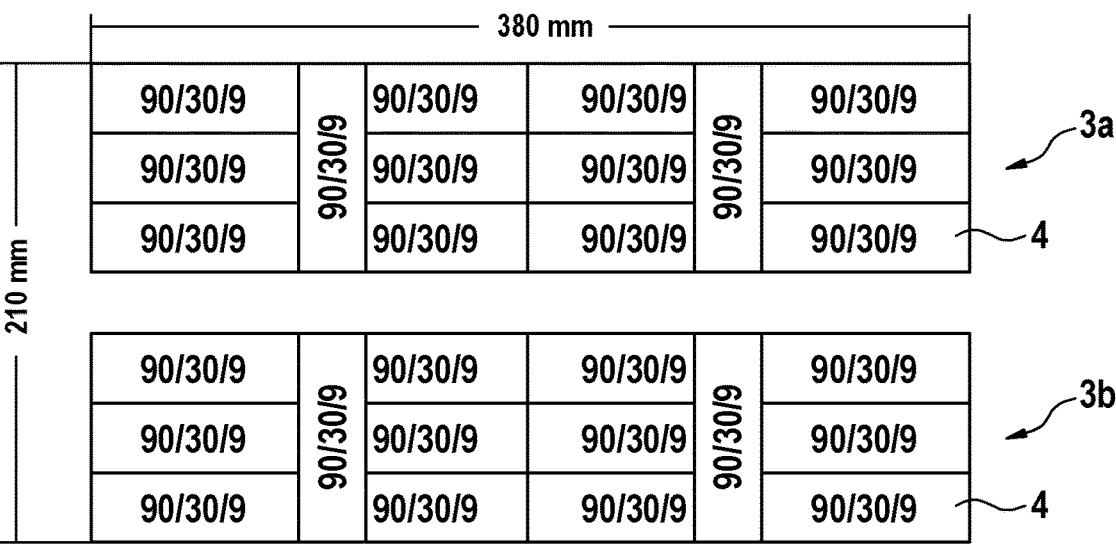

FIG. 2A shows a top view of the two ferrite plate assemblies 3a and 3b from FIG. 1, which are respectively made of a plurality of identically configured ferrite plates 4. Each ferrite plate 4 is 90 mm long, 30 mm wide and 9 mm high. Each ferrite plate assembly 3a and 3b is respectively 380 mm long and 90 mm wide and are arranged parallel to each other in such a manner so as to cover a width of 210 mm. That means that the ferrite plate assemblies 3a and 3b are spaced apart from each other by 30 mm. The ferrite plates 4 are arranged so as to be without gaps, parallel to and flush with one another.

Figure 2B:
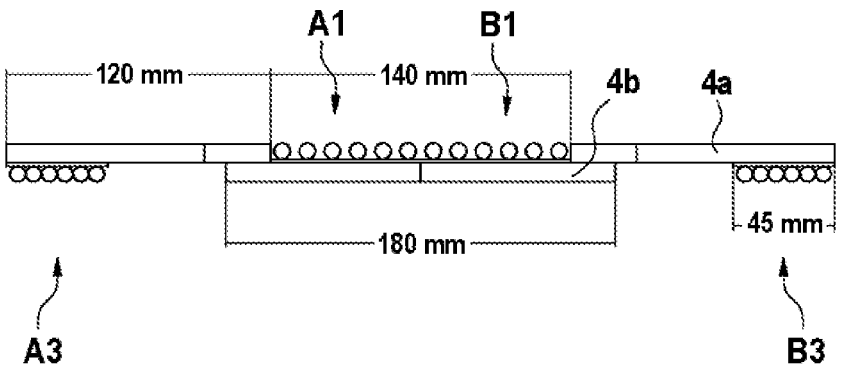

FIG. 2B shows a longitudinal cross-section of the ferrite plate assemblies 3a and 3b described above in FIG. 2A, wherein the conductors of the coils 1 and 2 are also shown. The conductors from the winding path sections A1, A3, B1 and B3 are depicted here, i.e. the internally and externally arranged conductor/conductor sections of the first coil and of the second coil. The ferrite arrangement comprises ferrite plates 4a in a first upper plane and ferrite plates 4b in a second lower plane. While the conductors in the path sections A3 and B3 are respectively arranged directly next to one another, the conductors in the path sections A1 and B1 are spaced evenly apart from one another. The conductors from the path sections A1 and B1 are arranged on the first upper plane and the conductors of the path sections A3 and B3 are arranged on the second lower plane. The total length of the ferrite plates 4b arranged on the lower plane is 180 mm, based on the length of two ferrite plates. The two ferrite plate arrangements of the ferrite plates 4a on the first plane each have a length of 120 mm, while the distance between the two arrangements on the first plane is 140 mm.

Figure 2C:
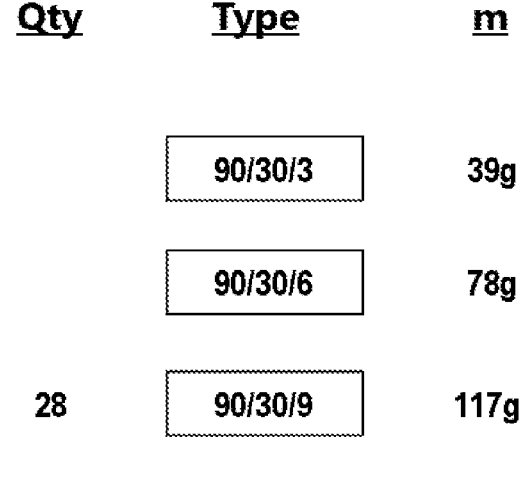

FIG. 2C indicates different types of ferrite plates, which essentially differ in height and weight. All ferrite plates have a length of 90 mm and a width of 30 mm. The 28 ferrite plates with a height of 9 mm used in the coil apparatus in FIG. 1 for both ferrite arrangements 3a and 3b have a total weight of 3.3 kg. It is noted that it is also possible to use differently shaped and/or sized ferrite plates for the embodiments disclosed herein.

Figure 3:
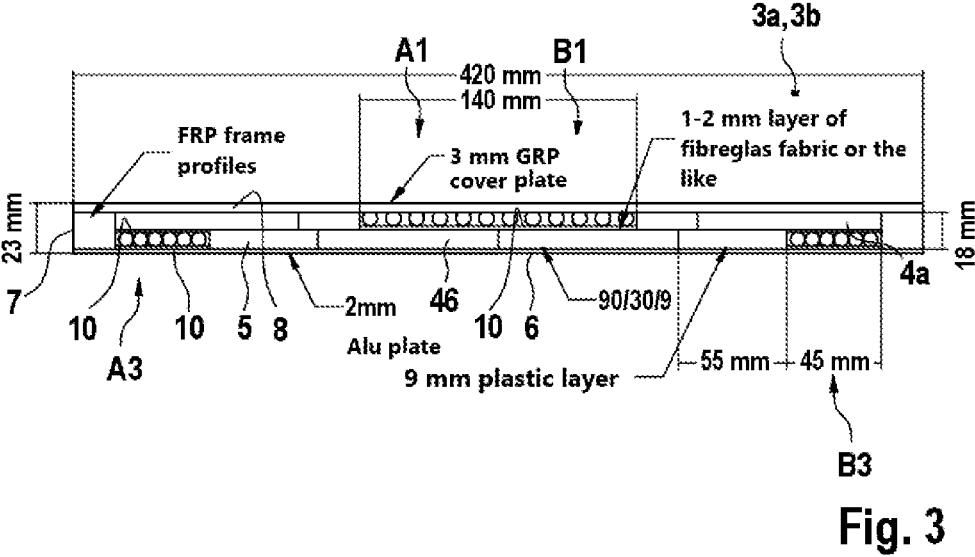

FIG. 3 shows a longitudinal cross-sectional view of a coil apparatus according to a further preferred embodiment, which comprises additional features in comparison with the coil apparatus of FIG. 1 or 2B. The entire coil apparatus has a height of 23 mm. A 3 mm thick GRP cover plate 8, which is 420 mm long and 300 mm wide, is arranged on top of the coil apparatus. Underneath, FRP frame profiles 7, respectively 18 mm high and wide, are arranged on the left and on the right at the edge of the coil apparatus. Arranged between the latter are the coils and ferrite arrangements with the ferrite plates 4a, 4b, which have already been described in FIGS. 1 and 2B. On the underside of the coil apparatus is a 2 mm thick aluminium plate 6, which is exactly as wide and long as the GRP cover plate 8.

Depicted in the first plane of the coil apparatus, as described above in FIG. 2B, are the conductors from the winding path sections A1 and B1. A fibreglass fabric 10, which has a thickness of 1 to 2 mm, is arranged between these conductors and the lower ferrite plates 4b. The conductors of the winding path sections A3 and B3 are arranged in the second plane and are separated from the ferrite plates 4a and from the aluminium plate 6 by fibreglass fabric layers 10. Arranged between the conductors of the winding path sections A3 and B3 and the ferrite plates 4b are plastic layers 5 with a thickness of 9 mm, which act as spacers and structural support elements. The plastic layers 5 are 55 mm wide and 9 mm high. The width of the winding path sections A3 and B3 is respectively 45 mm.

Figure 4:
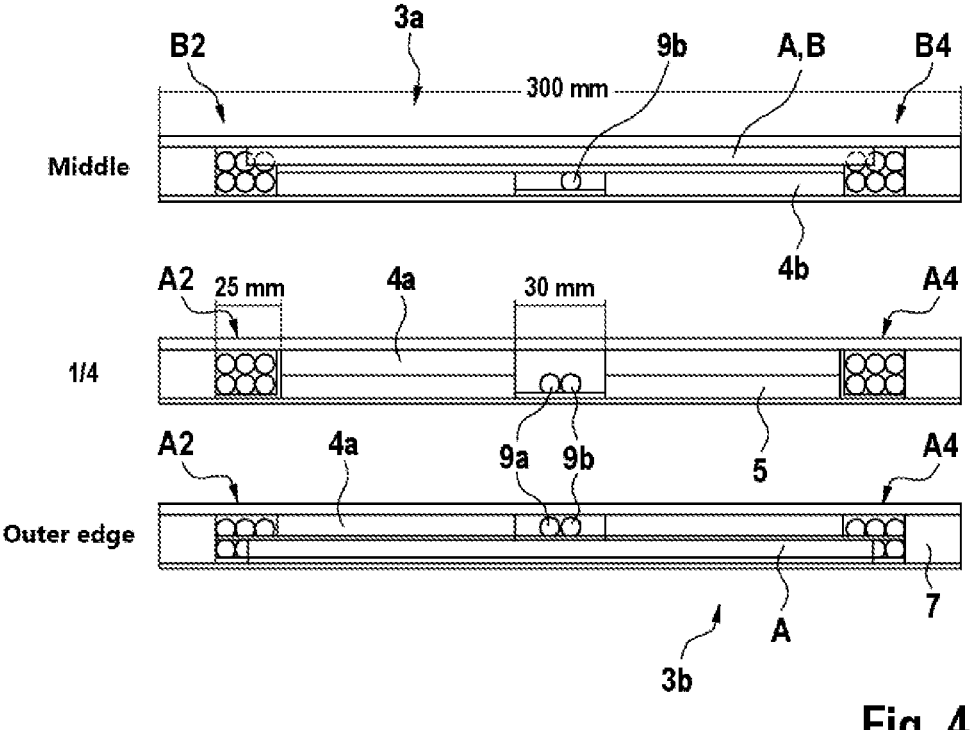

FIG. 4 shows three different cross-sectional views along the width of the coil apparatus of FIG. 3. The upper drawing in FIG. 4 shows a cross-section through the middle of the coil apparatus, through the boundary line between the described winding path sections A1 and B1. In particular, the supply conductor 9b on the lower plane and a conductor from the winding path section A1 or B1 are shown. The middle drawing of FIG. 4 depicts a cross-section at about one quarter of the length of the coil apparatus. The two supply conductors 9a and 9b in the middle as well as the conductors arranged in pairs on top of each other in the path sections A2 and A4 are clearly visible. The plastic layers 5 are also indicated below the ferrite plates 4a. In the bottom drawing of FIG. 4, a cross-sectional view at the outermost edge of the coil apparatus is depicted, the cross-section running through the path section A3 and the conductor A from the path section A3 being illustrated. The supply conductors 9a and 9b are arranged above the latter.

LIST OF REFERENCE SIGNS

1 First coil
2 Second coil
3 Ferrite arrangement
3a First ferrite plate assembly
3b Second ferrite plate assembly
4 Ferrite plate
4a Ferrite plate from the first or upper plane
4b Ferrite plate from the second or lower plane
5 Plastic layer
6 Aluminium plate
7 FRP (fibre-reinforced plastic) frame profile
8 GRP (glass-reinforced plastic) cover plate
9a Supply conductor
9b Supply conductor
10 Fibreglass fabric layer
A1 $1^{st}$ path section of the $1^{st}$ coil or internally arranged conductors/conductor sections
A2 $2^{nd}$ path section of the $1^{st}$ coil or laterally arranged conductors/conductor sections A3 $3^{rd}$ path section of the $1^{st}$ coil or externally arranged conductors/conductor sections
A4 $4^{th}$ path section of the $1^{st}$ coil or laterally arranged conductors/conductor sections
B1 $1^{st}$ path section of the $2^{nd}$ coil or internally arranged conductors/conductor sections
B2 $2^{nd}$ path section of the $2^{nd}$ coil or laterally arranged conductors/conductor sections
B3 $3^{rd}$ path section of the $2^{nd}$ coil or externally arranged conductors/conductor sections
B4 $4^{th}$ path section of the $2^{nd}$ coil or laterally arranged conductors/conductor sections
A First winding path (of the first coil)
B Second winding path (of the second coil)

The invention claimed is:

1. An induction receiving apparatus, comprising:
a first coil having a plurality of first turns; and
a second coil having a plurality of second turns,
wherein the first and second coils are connected in series and are wound in opposite directions relative to each other, wherein each turn has an internally arranged conductor section and an externally arranged conductor section,
wherein a portion of the first turns and the second turns include, respectively, the internally and externally arranged conductor sections configured and arranged such that each lie in a plane, wherein the planes diverge with respect to each other in a direction from the first coil to the second coil or vice versa, depending on whether the conductor sections are in the portion of the first turns or of the second turns,
wherein the internally arranged conductor sections are configured and arranged directly adjacent to one another and at least partially parallel to one another, and
wherein a distance between the directly adjacent internally arranged conductor sections of the first coil and second coil is greater than the distance between the directly adjacent externally arranged conductor sections of the first and second coils.

2. The apparatus of claim 1 further comprising:
a ferrite configured and arranged to (1) at least partially cover the internally arranged conductor sections of the first and second coils on a first side of the receiving apparatus facing an inductive transmitter system, and (2) to at least partially not cover remaining conductor sections of the first and second coils on a second side of the receiving apparatus.

3. The apparatus of claim 1 wherein the first and the second coils respectively are spiral-shaped.

4. The apparatus of claim 1, wherein directly adjacent laterally arranged conductors are arranged in pairs at least partially on top of each other.

5. The apparatus of claim 2, wherein the ferrite arrangement includes two rectangular ferrite plate assemblies arranged parallel to and spaced apart from each other, and wherein two supply conductors for the two coils run between the two ferrite plate assemblies.

6. The apparatus of claim 5, wherein the ferrite plate assemblies are formed from a plurality of identically shaped ferrite plates and from molded parts with a specific magnetic permeability.

7. The apparatus of claim 5, wherein the ferrite plate assemblies respectively have a recess in which the internally arranged conductor sections of the first and second coils are arranged.

8. The apparatus of claim 1, wherein the internally arranged conductor sections are arranged on a first plane and the externally arranged conductor sections are arranged on a second plane, and wherein the first plane is configured and arranged parallel to and at a distance from the second plane.

9. An induction receiving apparatus, comprising:

a first coil having a plurality of first turns;

a second coil having a plurality of second turns, wherein the first and second coils are connected in series and are wound in opposite directions relative to each other, wherein each turn has an internally arranged conductor section and an externally arranged conductor section, wherein a portion of the first turns and the second turns include, respectively, the internally and externally arranged conductor sections arranged such that each of the first and second turns lie in a plane, wherein the planes diverge with respect to each other in a direction from the first coil to the second coil or vice versa, depending on whether the conductor sections are in the portion of the first turns or of the second turns; and a ferrite configured and arranged to (1) at least partially cover the internally arranged conductor sections of the first and second coils on a first side of the receiving apparatus facing an inductive transmitter system, and (2) at least partially not cover remaining conductor sections of the first and second coils on a second side of the receiving apparatus.

10. The apparatus of claim 9 wherein the first and the second coils respectively are spiral-shaped.

11. The apparatus of claim 9, wherein the internally arranged conductor sections are configured and arranged directly adjacent to one another and at least partially parallel to one another.

12. The apparatus of claim 11, wherein a distance between the directly adjacent internally arranged conductor sections of the first coil and second coils is greater than the distance between the directly adjacent externally arranged conductor sections of the first and second coils.

13. The apparatus of claim 11, wherein directly adjacent laterally arranged conductors are arranged in pairs at least partially on top of each other.

14. The apparatus of claim 9, wherein the ferrite arrangement includes two rectangular ferrite plate assemblies arranged parallel to and spaced apart from each other, and wherein two supply conductors for the two coils run between the two ferrite plate assemblies.

15. The apparatus of claim 14, wherein the ferrite plate assemblies are formed from a plurality of identically shaped ferrite plates and from molded parts with a specific magnetic permeability.

16. The apparatus of claim 14, wherein the ferrite plate assemblies respectively have a recess in which the internally arranged conductor sections of the first and second coils are arranged.

17. The apparatus of claim 9, wherein the internally arranged conductor sections are arranged on a first plane and the externally arranged conductor sections are arranged on a second plane, wherein the first plane is configured and arranged parallel to and at a distance from the second plane.

18. An induction receiving apparatus, comprising:

a first coil having a plurality of first turns;

a second coil having a plurality of second turns, wherein the first and second coils are connected in series and are wound in opposite directions relative to each other, wherein each turn has an internally arranged conductor section and an externally arranged conductor section, wherein a portion of the first turns and the second turns include, respectively, the internally and externally arranged conductor sections arranged such that each of the first and second turns lie in a plane, wherein the planes diverge with respect to each other in a direction from the first coil to the second coil or vice versa, depending on whether the conductor sections are in the portion of the first turns or of the second turns, wherein the internally arranged conductor sections are configured and arranged directly adjacent to one another and at least partially parallel to one another; and a ferrite configured and arranged to (1) at least partially cover the internally arranged conductor sections of the first and second coils on a first side of the receiving apparatus facing an inductive transmitter system, and (2) at least partially not cover remaining conductor sections of the first and second coils on a second side of the receiving apparatus.

* * * * *